(12) United States Patent
Choate et al.

(10) Patent No.: US 10,344,793 B2
(45) Date of Patent: Jul. 9, 2019

(54) LIGHT WEIGHT SAFETY HOOK BODY

(71) Applicant: Reliance Industries, LLC, Wheat Ridge, CO (US)

(72) Inventors: Gary E. Choate, Lakewood, CO (US); William R. Hasse, Denver, CO (US)

(73) Assignee: RELIANCE INDUSTRIES, LLC, Wheat Ridge, CO (US)

( * ) Notice: Subject to any disclaimer, the term of this patent is extended or adjusted under 35 U.S.C. 154(b) by 0 days.

(21) Appl. No.: 15/809,714

(22) Filed: Nov. 10, 2017

(65) Prior Publication Data

US 2018/0142724 A1 May 24, 2018

Related U.S. Application Data

(60) Provisional application No. 62/424,019, filed on Nov. 18, 2016.

(51) Int. Cl.
 *F16B 45/00* (2006.01)
 *A62B 35/00* (2006.01)

(52) U.S. Cl.
 CPC .......... *F16B 45/00* (2013.01); *A62B 35/0075* (2013.01)

(58) Field of Classification Search
 CPC .............................. F16B 45/00; A62B 35/0075
 USPC ........... 248/690, 691, 692, 617, 100, 290.1, 248/294.1, 301, 322, 339; 24/599.1, 24/599.2, 599.4, 599.5, 599, 6, 600.1, 24/600.2; 294/82.2, 82.21
 See application file for complete search history.

(56) References Cited

U.S. PATENT DOCUMENTS

| | | | | |
|---|---|---|---|---|
| 426,778 | A * | 4/1890 | Dalton | A47G 33/1246 248/322 |
| 3,940,173 | A * | 2/1976 | Ulbing | B66C 1/36 294/82.21 |
| 4,835,823 | A * | 6/1989 | Contat | F16B 45/02 24/582.11 |
| 7,516,930 | B2 * | 4/2009 | Chen | F16B 7/0433 248/304 |
| 7,636,990 | B1 * | 12/2009 | Choate | F16B 45/02 24/600.1 |
| 7,647,677 | B2 * | 1/2010 | Casebolt | F16B 45/02 24/600.1 |
| 8,572,819 | B2 * | 11/2013 | Yang | F16B 45/02 24/599.5 |
| 9,121,437 | B1 * | 9/2015 | Carnicle | F16B 45/02 |
| 9,518,600 | B2 * | 12/2016 | Lin | F16B 45/02 |

(Continued)

*Primary Examiner* — Muhammad Ijaz
(74) *Attorney, Agent, or Firm* — Sandberg Phoenix & von Gontard PC

(57) ABSTRACT

A generally flat safety hook body having a central portion with a proximal end and a hook-shaped distal end opposite the proximal end, a generally flat nose portion extending from the distal end of the central portion, and a generally flat connector portion extending from the proximal end of the middle portion. The connector portion is separated from the nose portion by an opening or gate such that the hook body has a general "C" shape. A flange is formed about the perimeter of the body, and a thinner web extends across to connect the inner surfaces of the flange. In one embodiment the web is flat, while in another embodiment the web is concave. In one embodiment the thickness of the flange is uniform, while in another embodiment the thickness of the flange varies to correspond to different anticipated loads along the perimeter of the hook.

22 Claims, 11 Drawing Sheets

(56) References Cited

U.S. PATENT DOCUMENTS

| | | | |
|---|---|---|---|
| 2009/0049663 A1* | 2/2009 | Hong | B66C 1/36 24/600.1 |
| 2009/0056088 A1* | 3/2009 | Petzl | F16B 45/02 24/599.9 |
| 2011/0101044 A1* | 5/2011 | Chan | A47G 25/1428 223/85 |
| 2013/0025095 A1* | 1/2013 | Yang | F16B 45/02 24/599.5 |
| 2015/0231423 A1* | 8/2015 | Perner | A62B 35/0075 24/505 |
| 2018/0361176 A1* | 12/2018 | Ostrobrod | A62B 35/0075 |

* cited by examiner

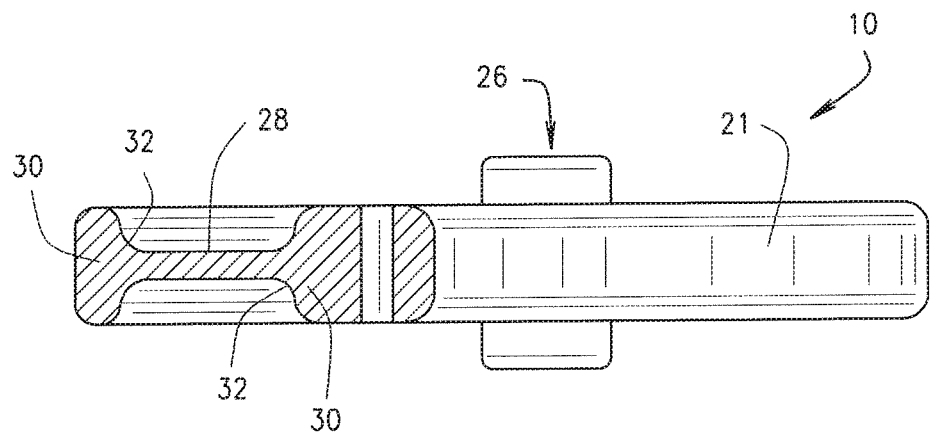
F I G . 4
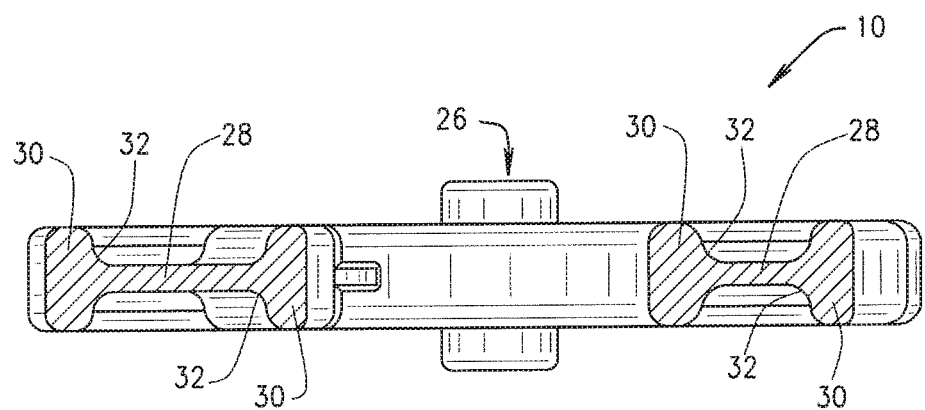
F I G . 5

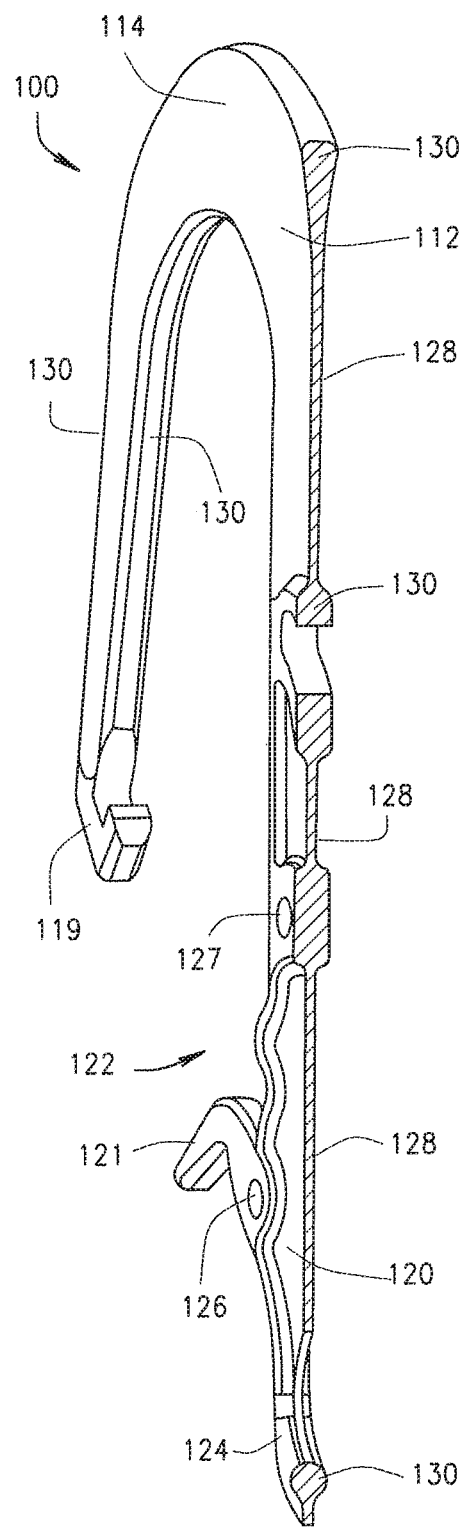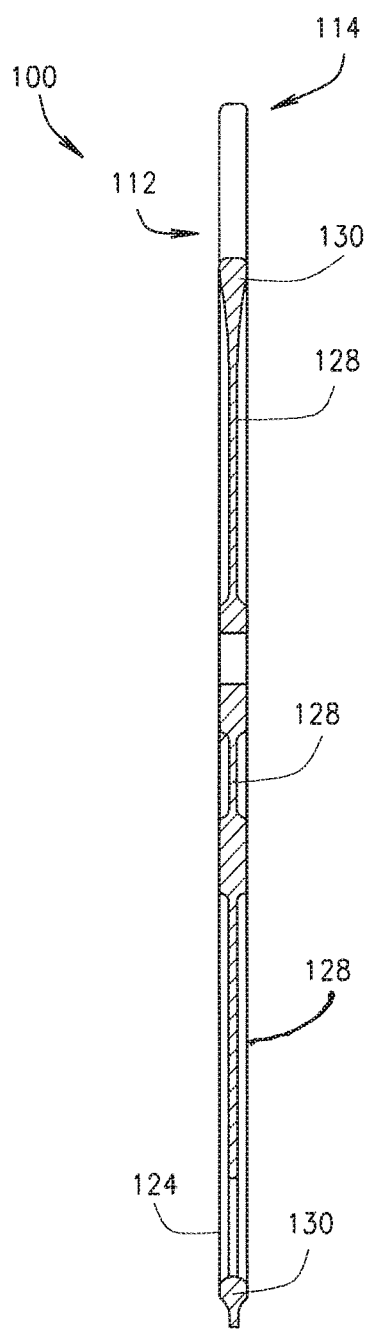
FIG. 9
FIG. 8

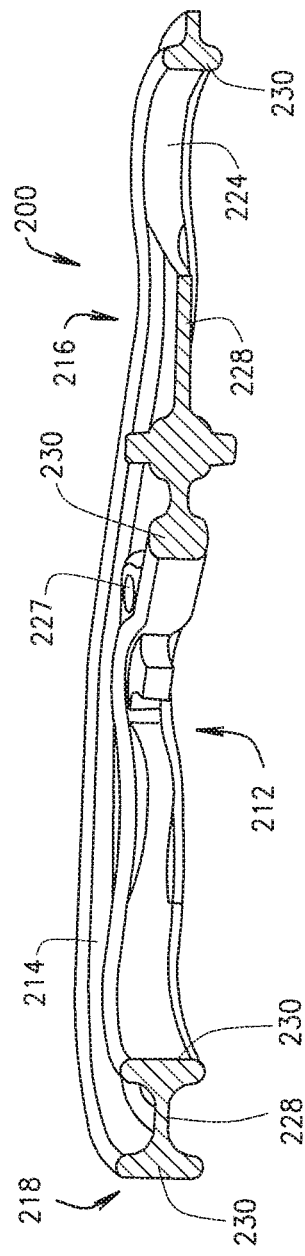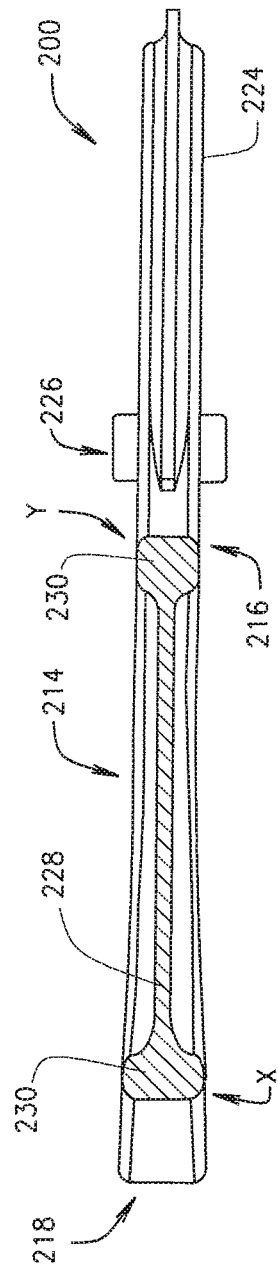

LIGHT WEIGHT SAFETY HOOK BODY

CROSS REFERENCE TO RELATED APPLICATIONS

This application claims the benefit of U.S. Provisional Application No. 62/424,019, entitled LIGHT WEIGHT SAFETY HOOK BODY, filed on Nov. 18, 2016. The disclosure of the above application is incorporated herein by reference.

STATEMENT REGARDING FEDERALLY SPONSORED RESEARCH OR DEVELOPMENT

Not applicable.

BACKGROUND OF THE INVENTION

This invention relates generally to safety hooks, and more particularly to safety hooks that comprise a novel configuration to improve strength and reduce weight without any adverse impact to the safety features that are critical to safety hooks.

It is not uncommon in the construction and building repair industries, and in other related industries, for individuals to work at elevated work positions, such as for example during the construction or repair of the upper floors of a multistory building. A number of safety devices are used in such situations. For example, safety harnesses and lanyards are devices that are designed to allow an individual to operate safely at what would otherwise be dangerous or deadly heights without risk of harm. Safety harnesses and lanyards are attached to each other and to support structures with safety hooks.

Safety hooks of various types are a cornerstone of fall-protection technology. Due to recent, more stringent ANSI standards over the last ten years, there have been a lot of changes to traditional safety hook designs. In the early phases of implementation, higher strength requirements were met by increasing the amount of material used and incorporation of larger cross-sections and reinforced locking mechanisms. The unintended consequence of these design changes has been that many fall-protection products have become substantially heavier. In addition, product interconnectivity compounds this problem. That is, the combination of various safety equipment components results in a corresponding increase in weight to the overall unit. For example, a typical lanyard utilizes two to three safety hook connectors, each of which has its own designed-in weight increases.

In addition, compact, personal self-retracting devices have proliferated during this same period of time, and each such device requires the use of 1-3 connectors (such as safety hooks). As a result of these multi-component trends, there has been an increased sensitivity to the weight of products, and most manufacturers and OEM hardware suppliers have been on a campaign to utilize lighter materials with simpler mechanisms to reduce the weight of their products. There has therefore been a recent push in the safety equipment industry to reduce the weight of safety equipment, including safety hooks, in order to reduce the burden on workers who may be carrying as much as 50 pounds or more of tool and safety equipment while elevated a substantial height above the ground. In the past, the focus of design for safety products, including safety hooks, was on maximizing product strength and ease of production.

Where safety hooks are concerned, a common strategy has been to forge hook and carabiner bodies out of aluminum alloy or other light-weight materials. The disadvantage of this strategy is that while these alloys can have a high tensile strength, they can be unacceptably brittle and may not adequately yield under eccentric loads. In order to address these shortcomings, a paradox is created in that a great deal of high grade aluminum must be used in the alloy to yield acceptable attributes, which results in minimal weight savings and increased costs.

One recognized approach for decreasing weight while maintaining structural strength of physical products is to incorporate a web and flange configuration across areas of high stress or load. For example, one way to increase the strength of a beam is to place as much stress-bearing material as far from the beam's neutral axis as possible, the neutral axis being the centroid of the mass moment of inertia of the beam. This approach traditionally imposes a requirement for symmetrical cross sections so that the compression and tensile stress fibers under load are equal. Hence, maintaining the neutral axis of the material cross section at its geometric center allows for the reduction of material thickness (and weight) in those areas while maintaining adequate overall strength. However, if the cross sections have asymmetrical cross-sections, dynamic loads applied to the beam can cause a differential stress distribution among the stress fibers in the beam that can result in a catastrophic failure.

Owing to the variation and dynamic nature of the stress loads placed upon them, safety hooks have not traditionally been constructed with symmetrical cross-sections and therefore have not been designed with web and flange components. Nonetheless, it would be desirable to design and incorporate a web and flange configuration that could be incorporated into a safety hook in order to reduce the weight while maintaining adequate strength to withstand the anticipated stress loads for which the hook is designed. As will become evident in this disclosure, the present invention provides benefits over the existing art.

BRIEF DESCRIPTION OF THE DRAWINGS

The illustrative embodiments of the present invention are shown in the following drawings which form a part of the specification:

FIG. 4 is a first cross-sectional plan view of the safety hook body of FIG. 1 at the plane A-A depicted in FIG. 2;

FIG. 5 is a second cross-sectional plan view of the safety hook body of FIG. 1 at the plane B-B depicted in FIG. 2;

FIG. 8 is a first cross-sectional plan view of the safety hook body of FIG. 6 at the plane C-C depicted in FIG. 7;

FIG. 9 is a perspective view of the first cross-sectional plan view of FIG. 8;

FIG. 14 is a perspective view of the first cross-sectional plan view of FIG. 13;

FIG. 15 is a second cross-sectional plan view of the safety hook body of FIG. 11 at the plane F-F depicted in FIG. 12;

Corresponding reference characters indicate corresponding parts throughout the several views of the drawings.

DETAILED DESCRIPTION

Figure 1:
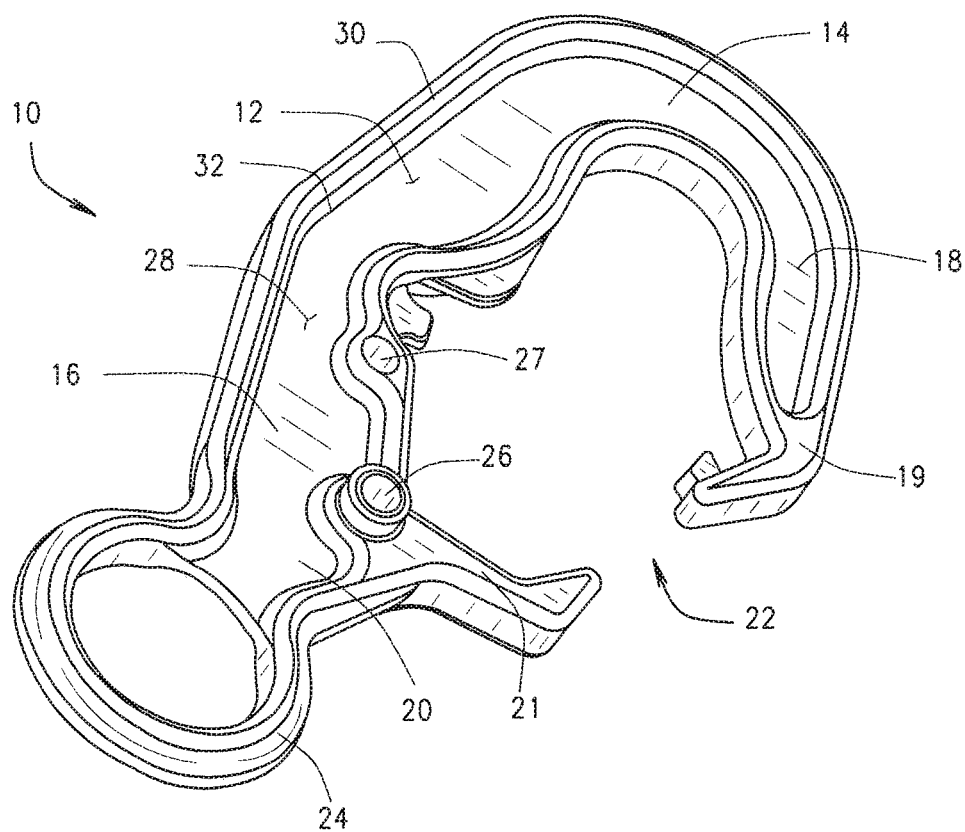
FIG. 1 is a perspective view of a first safety hook body incorporating one representative embodiment of the present invention.

The following detailed description illustrates the claimed invention by way of example and not by way of limitation. This description will enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. Rather, the invention is intended to cover all alternative embodiments and modifications that fall within the spirit and scope of the invention as defined by the claims included herein as well as any equivalents of the disclosed and claimed invention. Hence, the claimed invention is capable of other embodiments and of being practiced or being carried out in various ways. Also, it is to be understood that the phraseology and terminology used herein is for the purpose of description and should not be regarded as limiting.

Figure 2:
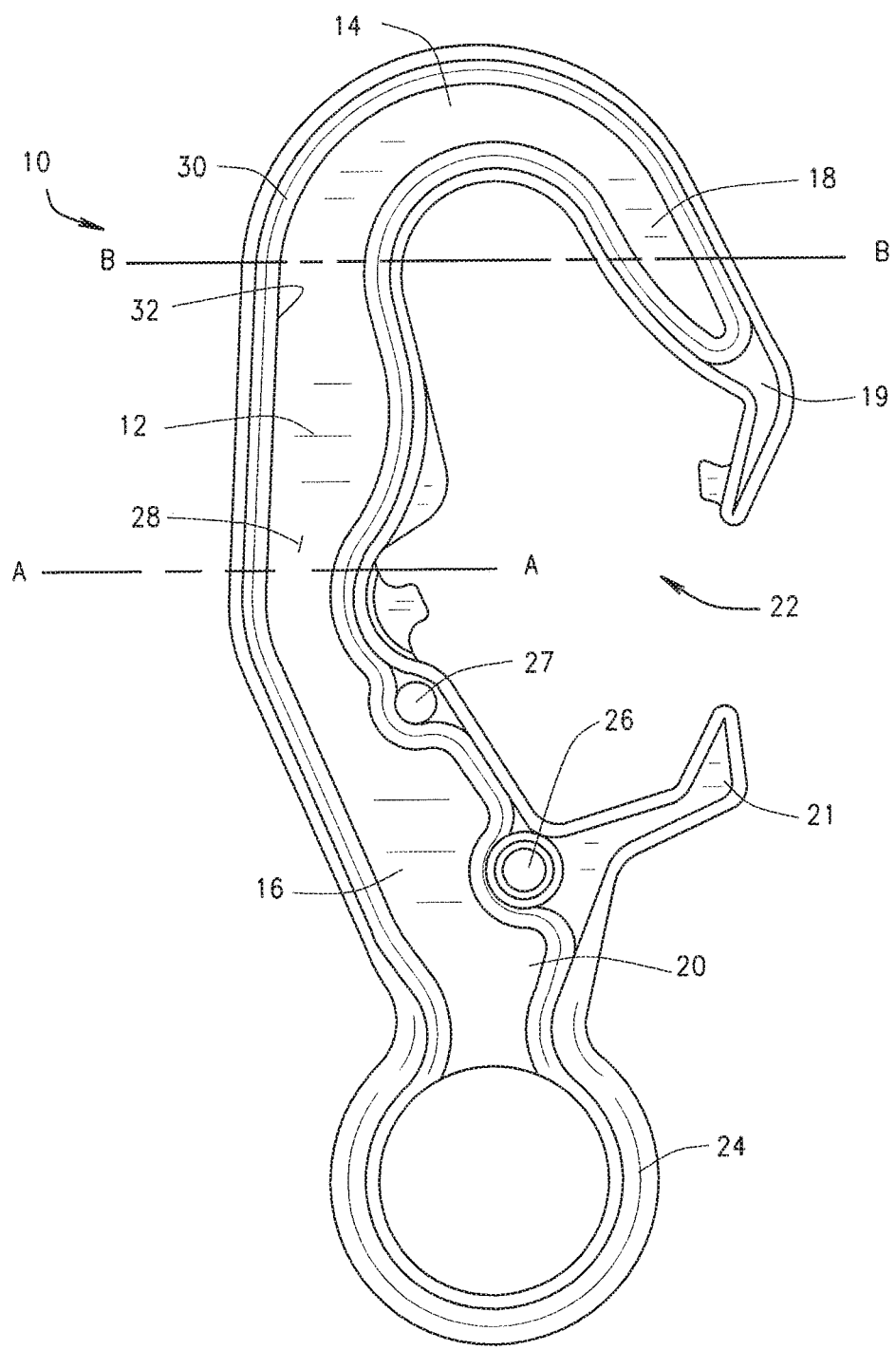
FIG. 2 is a top view of the safety hook body of FIG. 1.
Figure 3:
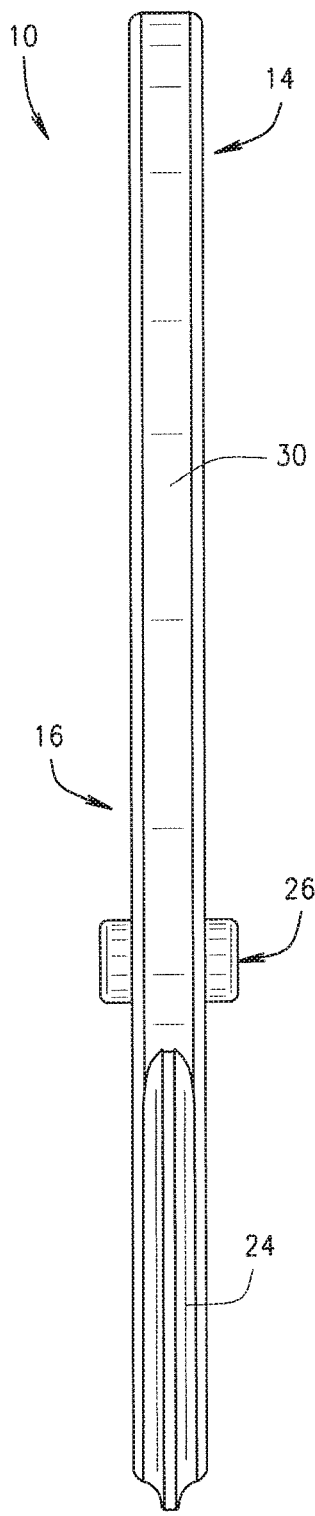
FIG. 3 is a plan view of the backside of the safety hook body of FIG. 1.

In referring to the drawings, a first embodiment of the novel safety hook body 10 of the present invention is shown generally in FIGS. 1-5, where the present invention is depicted by way of example. As can be seen, the safety hook body 10 is generally uniplanar and comprises a curved central portion 12 with a distal end 14 and a neck or proximal end 16, a nose portion 18 that extends from the distal end 14 of the central portion 12 with a tip 19 at its furthest end, and a connector or shank portion 20 that extends from the proximal end 16 of the central portion 12. A leg 21 extends from the shank portion 20 in a direction outward and upward generally toward the tip 19 of the nose portion 18. The tip 19 of the nose portion 18 is separated from the leg 21 of the shank portion 20 by an opening or gate 22. A connecting ring 24 extends from the bottom of the neck or proximal 16 of the central portion 12, and a first through bore 26 extends perpendicularly through the proximal end 16 of the central portion 12 at the proximal end of the leg 21 near the juncture between the central portion 12 and the shank portion 20. A second through bore 27 extends perpendicularly through the inner edge of the body 10 near the middle of the central portion 12.

The body 10 has a relatively thin and generally flat central web 28 surrounded by a raised flange 30 that forms an outer perimeter about the body 10. The central web 28 is flat and intercepts the flange 30 at a generally sharp, nearly 90 degree angle, although for failure prevention and manufacturing purposes, a small radius or rounded break 32 is formed along the intersection between the web 28 and flange 30 to minimize the chance of rupture. The flange 30 is generally uniform in width and cross-section along its full length about the body 10. However, exceptions to the uniformity of the flange 30 exist.

As can be seen in the Figures, the flange 30 expands fully across the tip 19 of the nose portion 18 such that the web 28 is entirely subsumed by the flange 30 in the tip 19 of the nose portion 18. Likewise, near the juncture between the central portion 12 and the shank portion 20, the flange 30 expands outward to fully subsume the web 28 across the leg 21 and inward into the web 28 to surround the first through bore 26. The flange 30 also expands inward into the web 28 to surround the second through bore 27. Further, where the flange 30 envelopes and defines the connecting ring 24, the flange 30 expands outward to assume a generally semicircular cross-sectional shape.

As can be appreciated by one of ordinary skill in the art, it is expected that a complete load stress analysis of the novel web and flange design of the first embodiment of the safety hook body 10 will establish that the body 10 will provide sufficient strength to support anticipated loads on the safety hook without failure while simultaneously achieving a significant reduction in overall weight of the safety hook.

Figure 6:
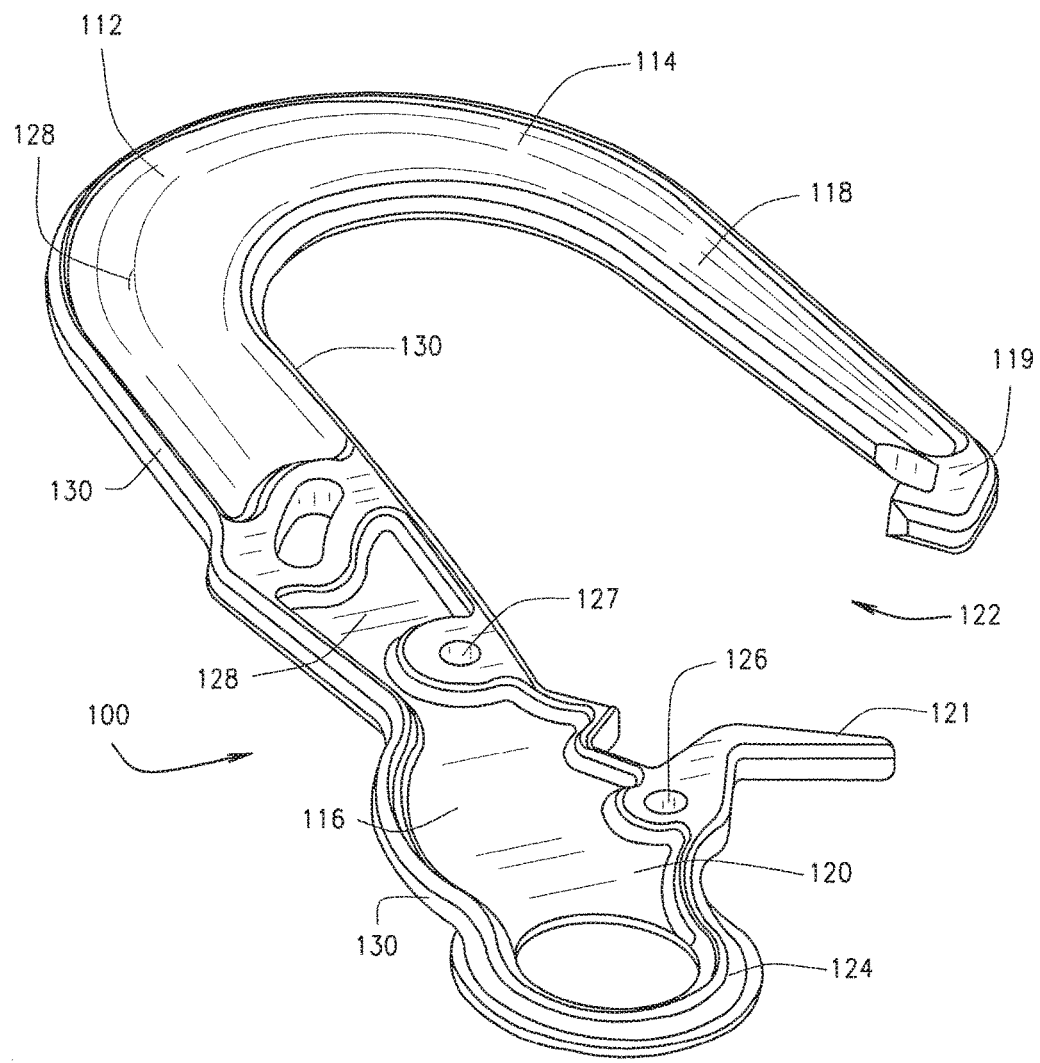
FIG. 6 is a perspective view of a second safety hook body incorporating a second representative embodiment of the present invention.
Figure 7:
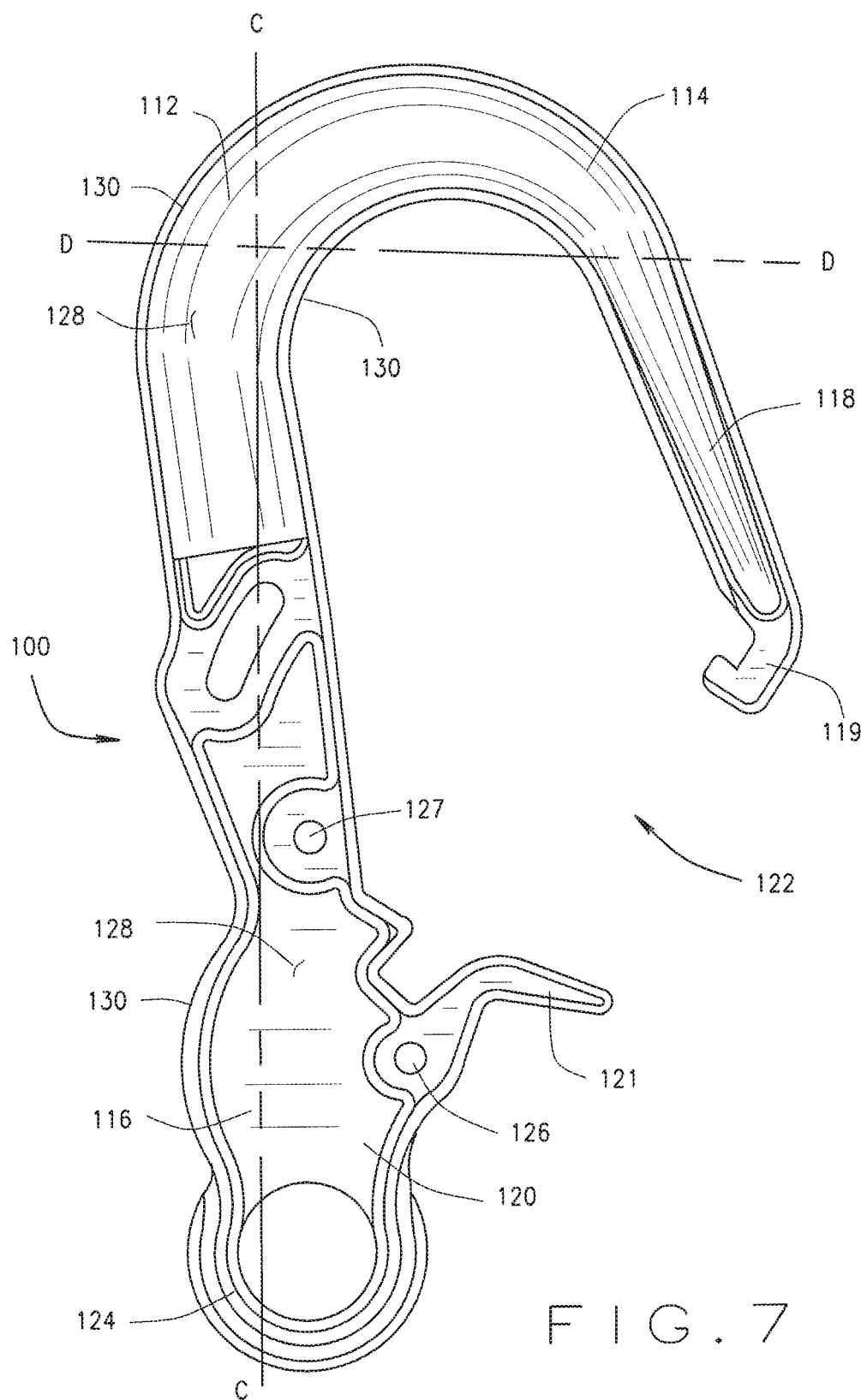
FIG. 7 is a top view of the safety hook body of FIG. 6.
Figure 10:
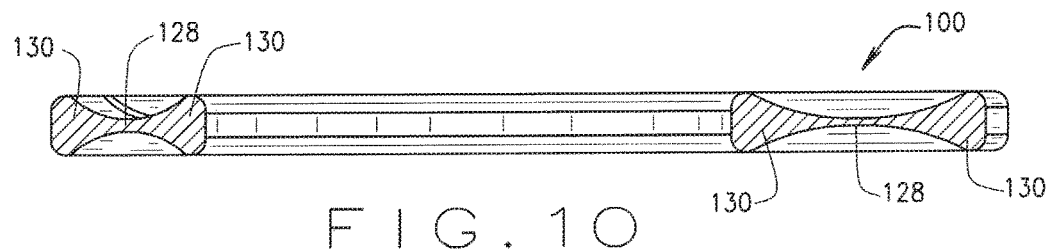
FIG. 10 is a second cross-sectional plan view of the safety hook body of FIG. 6 at the plane D-D depicted in FIG. 7.

A second embodiment of the present invention is shown generally at 100 in FIGS. 6-10, where the present invention is depicted by way of further example. As in the first embodiment 10, the safety hook body 100 is generally flat or uniplanar and comprises a curved central portion 112 with a distal end 114 and a proximal end 116, a nose portion 118 that extends from the distal end 114 of the central portion 112 with a tip 119 at its furthest end, and a connector or shank portion 120 that extends from the proximal end 116 of the central portion 112. A leg 121 extends from the shank portion 120 in a direction outward and upward generally toward the tip 119 of the nose portion 118. The tip 119 of the nose portion 118 is separated from the leg 121 of the shank portion 120 by an opening or gate 122. A connecting ring 124 extends from the bottom of the neck or proximal end 116 of the central portion 112, and a first through bore 126 extends perpendicularly through the proximal end 116 of the central portion 112 at the proximal end of the leg 121 near the juncture between the central portion 112 and the shank portion 120. A second through bore 127 extends perpendicularly through the inner edge of the body 100 near the middle of the central portion 112.

Further, like the first embodiment body 10, the body 100 comprises a central web 128 surrounded by a raised flange 130 that forms a perimeter about the body 100. However, in this second embodiment 100, while the web 128 is flat in the neck or proximal end 116 of the body 100, the web 128 is not flat in the hook-shaped region of the body 100 stretching from the central portion 112 across the distal end 114 and into the nose portion 118. Rather, in this region, the web 128 is concave on both sides, and therefore the web 128 gradually melds into the surrounding flange 130 instead of the sharp "90 degree" interface as seen between the web 28 and the flange 30 of the body 10. This further strengthens the snap hook by distributing across the full width of the hook inside the flange 130 the loads placed upon the body 100. The flange 130 is otherwise generally uniform in width and cross-section along its full length about the body 100. In addition, certain exceptions to the general shape of the web 128 and associated flange 130 exist.

As can be seen in the Figures, the flange 130 expands fully across the tip 119 of the nose portion 118 such that the web 128 is entirely subsumed by the flange 130 in the tip 119 of the nose portion 118. Likewise, near the juncture between the central portion 112 and the shank portion 120, the flange 130 expands outward to fully subsume the web 128 across the leg 121 and inward into the web 128 to surround the first through bore 126. The flange 130 also expands inward into the web 128 to surround the second through bore 127.

Further, where the flange 130 envelopes and defines the connecting ring 124, the flange 130 expands outward to assume a semicircular cross-sectional shape.

As can be appreciated by one of ordinary skill in the art, it is expected that a complete load stress analysis of the novel web and flange design of the second embodiment of the safety hook body 100 will also establish that the body 100 will provide sufficient strength to support anticipated loads on the safety hook without failure while simultaneously achieving a significant reduction in overall weight of the safety hook. In particular, it is anticipated that the concave structure of the web 128 will more effectively and uniformly dissipate loads in the direction of the sloping walls of the concave surface of the flange 130 across the body 100, and thereby enhance the strength of the safety hook in those areas.

Figure 11:
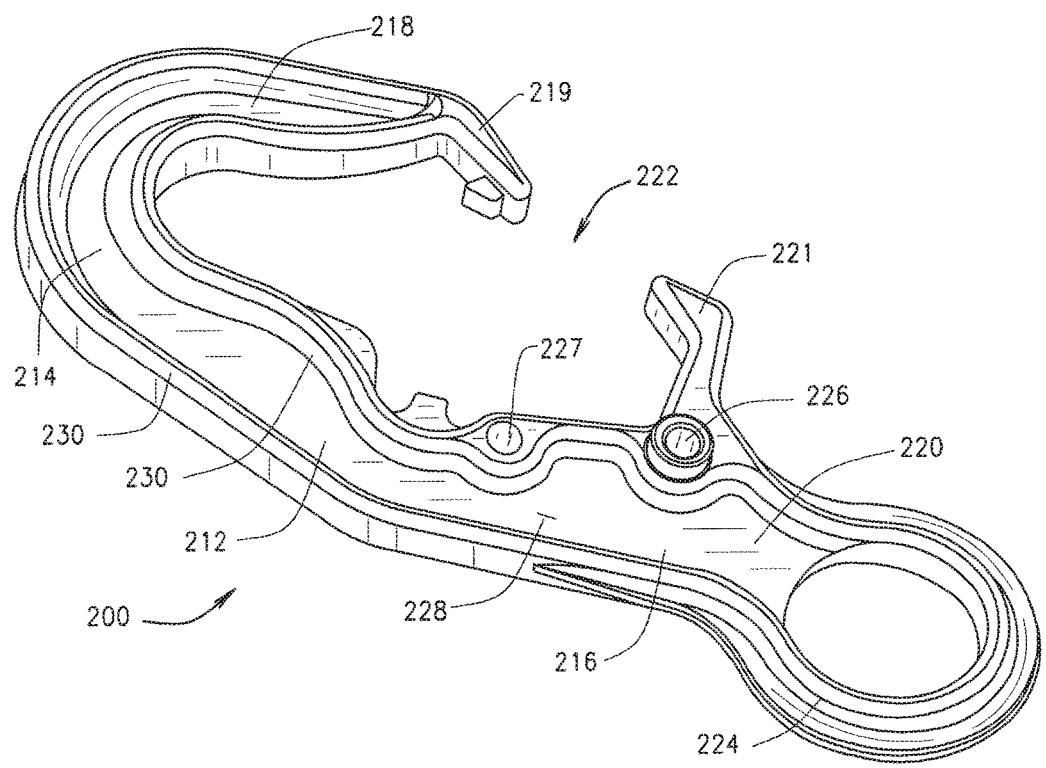
FIG. 11 is a perspective view of a third safety hook body incorporating a third representative embodiment of the present invention.
Figure 12:
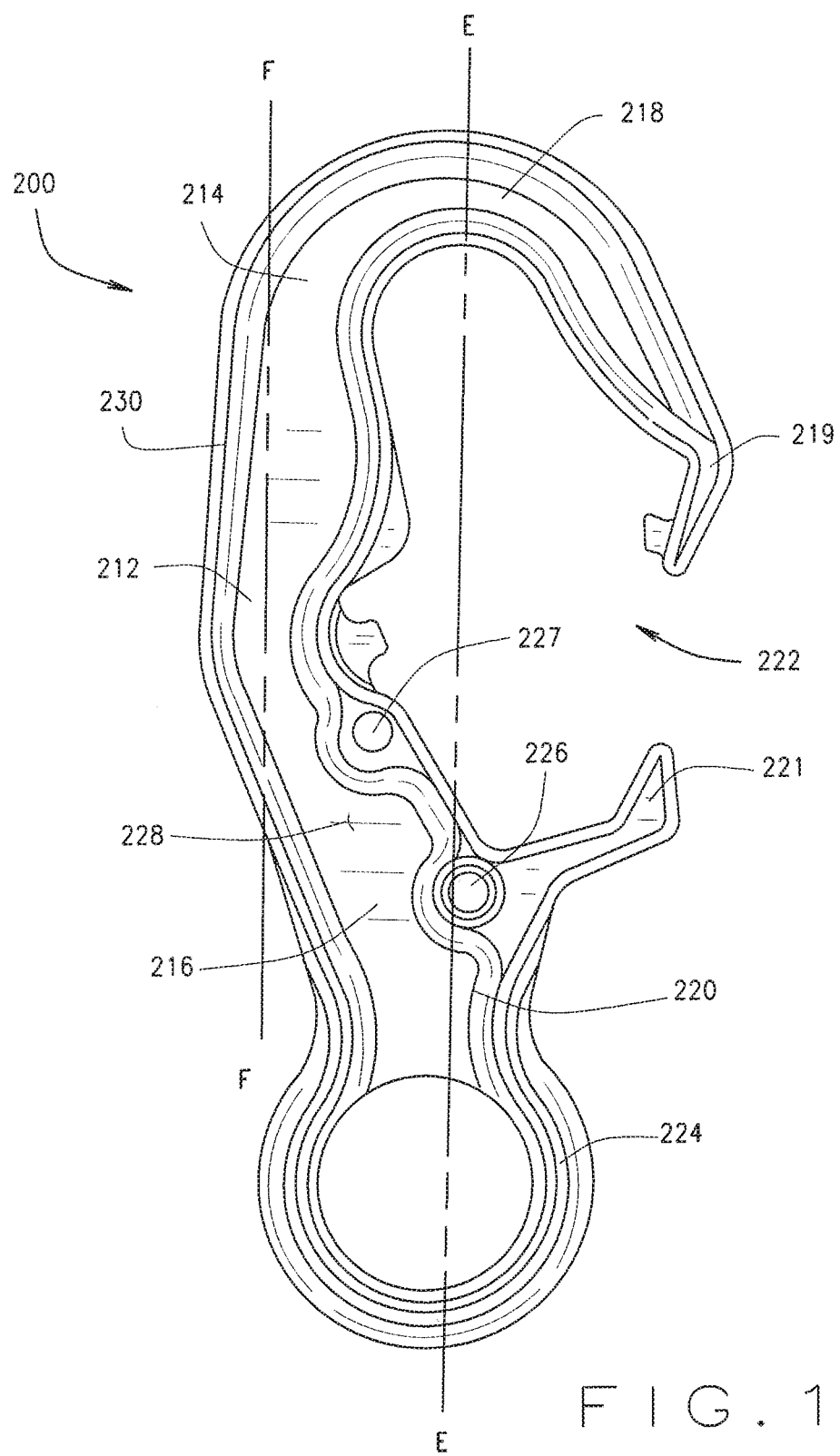
FIG. 12 is a top view of the safety hook body of FIG. 11.
Figure 13:
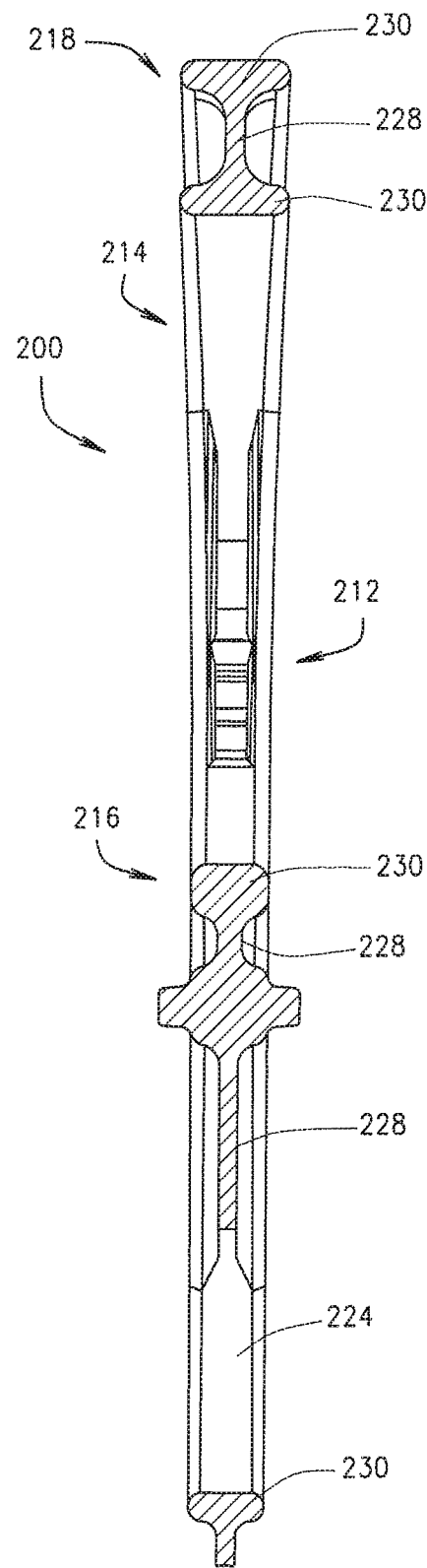
FIG. 13 is a first cross-sectional plan view of the safety hook body of FIG. 11 at the plane E-E depicted in FIG. 12.

A third embodiment of the present invention is shown generally at 200 in FIGS. 10-15, where the present invention is depicted by way of further example. As in the first embodiment 10 and the second embodiment 100, the safety hook body 200 is generally flat or uniplanar and comprises a curved central portion 212 with a distal end 214 and a proximal end 216, a nose portion 218 that extends from the distal end 214 of the central portion 212 with a tip 219 at its furthest end, and a connector or shank portion 220 that extends from the proximal end 216 of the central portion 212. A leg 221 extends from the shank portion 220 in a direction outward and upward generally toward the tip 219 of the nose portion 218. The tip 219 of the nose portion 218 is separated from the leg 221 of the shank portion 220 by an opening or gate 222. A connecting ring 224 extends from the bottom of the neck or proximal end 216 of the central portion 212, and a first through bore 226 extends perpendicularly through the proximal end 216 of the central portion 212 at the neck or proximal end 216 of the leg 221 near the juncture between the central portion 212 and the shank portion 220. A second through bore 227 extends perpendicularly through the inner edge of the body 200 near the middle of the central portion 212.

Further like the first embodiment body 10 and the second embodiment 100, the body 200 comprises a relatively thin central web 228 surrounded by a raised flange 230 that forms a perimeter about the body 200, and the web 228 is flat. However, in this third embodiment 200, the flange does not have a uniform height or cross-section. Rather, the shape of the flange 230 is tailored to correspond to the anticipated stress loads across the body 200 and along the perimeter as defined by the flange 230. As a result, the flange 230 varies in both height and cross-sectional shape as circumscribes the body 200. For example, in referring to FIGS. 13-14, it can be seen that the flange 230 has a substantially uniform cross-section about the connecting ring 224. Yet, it can be seen that height of the flange 230 tapers upward along the spine of the body 200, from the central portion 212 where the flange 230 has a height generally the same as along the connecting ring 224, to the nose portion 218, where it can be seen that the flange 230 is substantially taller. By way of further example, it can be seen in FIG. 15, that the flange 230 broadens or widens in the hooked or curved area of the nose portion 218 such that the flange 230 is thicker along the length of the flange 230 designated by the letter X than the other lengths of the flange 230, such as for example the lengths designated by the letter Y.

Like the first embodiment body 10 and the second embodiment 100, the flange 230 expands fully across the tip 219 of the nose portion 218 such that the web 228 is entirely subsumed by the flange 230 in the tip 219 of the nose portion 218. Likewise, near the juncture between the central portion 212 and the shank portion 220, the flange 230 expands outward to fully subsume the web 228 across the leg 221 and inward into the web 228 to surround the first through bore 226. The flange 230 also expands inward into the web 228 to surround the second through bore 227. Further, where the flange 230 envelopes and defines the connecting ring 224, the flange 230 expands outward to assume a semicircular cross-sectional shape and a flat central lip 232 extends radially outward from the center of the outer surface of the flange 230.

As can be appreciated by one of ordinary skill in the art, it is expected that a complete load stress analysis of the novel web and flange design of the third embodiment of the safety hook body 200 will also establish that the body 200 will provide sufficient strength to support anticipated loads on the safety hook without failure while simultaneously achieving a significant reduction in overall weight of the safety hook. Moreover, it is anticipated that by tailoring the size and shape of the flange 230 to correspond to the anticipated stress loads on the body 200, the weight of the body 200 can be reduced while maintaining sufficient strength to accommodate the anticipated stress loads across the body. That is, the thickness and width of the flange 230 varies along its length and is shaped to conform to the anticipated stress loads on a safety hook having the body 200. In the areas of the body 200 where anticipated stress loads are high, the thickness and width are increased but only to the amount and in the direction required to accommodate the anticipated stress loads in that area, while in contrast, in the areas of the body 200 where anticipated stress loads are lower, the thickness and width can actually be decreased.

While we have described in the detailed description several configurations that may be encompassed within the disclosed embodiments of this invention, numerous other alternative configurations, that would now be apparent to one of ordinary skill in the art, may be designed and constructed within the bounds of our invention as set forth in the claims. Moreover, the above-described novel mechanisms of the present invention, shown by way of example at 10, 100 and 200, can be arranged in a number of other and related varieties of configurations without departing from or expanding beyond the scope of our invention as set forth in the claims.

For example, the thickness of the web 28, 128 and 228, is not limited to that shown in the alternate embodiments 10, 100 or 200. Rather, the web 28, 128 and 228 may be thicker or thinner, wider or narrower, than as shown in the Figures, so long as the web in combination with its respective flange 30, 130 or 230 provides a reduction in weight over a traditional safety hook body while providing sufficient strength to meet the demands of anticipated stress loads. Similarly, the width and thickness of the flange 30, 130 and 230 is not limited to that shown in the alternate embodiments 10, 100 or 200. Rather, the flange 30, 130 and 230 may be thicker or thinner, wider or narrower, than as shown in the Figures, so long as the flange in combination with its respective web 28, 128 or 228 provides a reduction in weight over a traditional safety hook body while providing sufficient strength to meet the demands of anticipated stress loads. Further, the variations in the width and thickness of the flange 230 is not limited to that shown in FIGS. 11-15. Rather, the variations in the width and thickness of the flange 230 about the perimeter of the body 200 are designed to correspond to the anticipated stress loads for each particular safety hook configuration, such that variations in the width and thickness of the flange 230 will almost certainly be different from one safety hook design to another.

By way of further example, it is not necessary that the body 10, 120 or 200 have the specific configuration as depicted in the Figures, but may be taller or shorter, wider or thicker, or have alternate shapes, so long as the body is shaped to operate as part of a safety hook and incorporates at least in part a web and flange configuration in which the web is thinner than the flange.

Additional variations or modifications to the configuration of the novel mechanism of the present invention, shown by way of example at 10, 100 and 200, may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of our invention.

What is claimed is:

1. A body for a safety hook, said body comprising:
   a. a generally planar central web having a first face and a second face, said second face directed substantially opposite said first face, said first and second faces being separated by a thickness there between, said central web having an inner edge and an outer edge opposite said inner edge; and
   b. a flange oriented generally perpendicular to the central web, said flange having an inner section extending at least in part from the inner edge of the central web, said flange having a first height, said first height being greater than the thickness of the central web in proximity to the inner section of the flange, said inner section of the flange defining an inner contour of said safety hook, said flange having an outer section extending at least in part from the outer edge of the central web, said flange having a second height, said second height being greater than the thickness of the central web in proximity to the outer section of the flange, said outer section of the flange defining an outer contour of said safety hook;
   wherein the inner section of the flange, the outer section of the flange and the first face of the central web combine to define a substantially continuous first concave surface, said first concave surface being generally arcuate in cross-section.

2. The body of claim 1, wherein the inner section of the flange extends the full length of the inner edge of the central web.

3. The body of claim 1, wherein the outer section of the flange extends the full length of the outer edge of the central web.

4. The body of claim 1, wherein the first concave surface defines a circular arc.

5. The body of claim 1, wherein the inner section of the flange, the outer section of the flange and the second face of the central web combine to define a substantially continuous second concave surface, said second concave surface being generally arcuate.

6. The body of claim 5, wherein the second concave surface defines a circular arc.

7. The body of claim 1, wherein the flange comprises an upper surface, said upper surface being substantially planar.

8. The body of claim 1, wherein the flange comprises a lower surface, said lower surface being substantially planar.

9. The body of claim 1, wherein the upper surface and the lower surface are substantially parallel.

10. A body for a safety hook, said body comprising:
    a. a generally planar central web having a first face and a second face, said second face directed substantially opposite said first face, said first and second faces being separated by a thickness there between;
    b. an inner edge extending from said first face of said central web to said second face of said central web, said inner edge generally defining an inner contour of the safety hook;
    c. an outer edge positioned generally opposite the central web from said inner edge, said outer edge extending from said first face of said central web to said second face of said central web, said outer edge generally defining an outer contour of the safety hook;
    wherein the first face of the central web defines a substantially continuous first concave surface, said first concave surface being generally arcuate in cross-section and extending substantially from the inner edge to the outer edge.

11. The body of claim 10, wherein said first concave surface defines a circular arc.

12. The body of claim 10, wherein the second face of said central web defines a substantially continuous second concave surface, said second concave surface being generally arcuate in cross-section and extending substantially from the inner edge to the outer edge.

13. The body of claim 12, wherein said second concave arc substantially mirrors said first concave arc.

14. The body of claim 12, wherein said second concave surface defines a circular arc.

15. The body of claim 10, wherein the inner edge and the outer edge collectively define a substantially complete outer perimeter of the body.

16. The body of claim 10, further comprising a flange, said flange being oriented generally perpendicular to the central web, said flange extending at least in part from the inner edge of the central web, said flange having a height, said flange defining an inner contour of said body of said safety hook.

17. The body of claim 16, wherein the inner edge has a height at an interface between the inner edge and the flange, the height of the flange being greater than the height of the inner edge in proximity to said interface.

18. The body of claim 16, wherein the inner edge has a uniform height along its full length, the flange has a uniform height along its intersection with the inner edge, and said uniform height of the flange is greater than said uniform height of the inner edge.

19. The body of claim 10, further comprising a flange, said flange being oriented generally perpendicular to the central web, said flange extending at least in part from the outer edge of the central web, said flange having a height, said flange defining an outer contour of said body of safety hook.

20. The body of claim 19, wherein the outer edge has a height at an interface between the outer edge and the flange, the height of the flange being greater than the height of the outer edge in proximity to said interface.

21. The body of claim 19, wherein the outer edge has an uniform height along its full length, the flange has a uniform height along its intersection with the outer edge, and said uniform height of the flange is greater than said uniform height of the outer edge.

22. The body of claim 16, wherein the flange substantially encircles the central web and defines a complete perimeter of the body.

\* \* \* \* \*